United States Patent
Lefeuvre

[11] 3,845,700
[45] Nov. 5, 1974

[54] VENTILATION SHUTTER CONTROL OF MOTOR VEHICLE

[75] Inventor: André Lefeuvre, Billancourt, France

[73] Assignees: Regie Nationale Des Usines Renault, Billancourt; Automobiles Peugeot, Paris, both of, France

[22] Filed: July 5, 1972

[21] Appl. No.: 269,075

[30] Foreign Application Priority Data
Aug. 9, 1971  France .............................. 71.29045

[52] U.S. Cl. ........................................ 98/2, 98/2.01
[51] Int. Cl. ........................................... B60h 1/12
[58] Field of Search ............................ 98/2, 2.01

[56] References Cited
UNITED STATES PATENTS

| | | | |
|---|---|---|---|
| 2,445,392 | 7/1948 | Findley | 98/2.01 |
| 2,694,970 | 11/1954 | Schneider | 98/2.01 |
| 3,028,800 | 4/1962 | Anderson | 98/2.01 |
| 3,403,855 | 10/1968 | Bouthors et al. | 98/2.01 |
| 3,587,439 | 6/1971 | Mercier | 98/2 |

FOREIGN PATENTS OR APPLICATIONS

| | | | |
|---|---|---|---|
| 1,586,880 | 3/1970 | France | |
| 1,285,410 | 1/1962 | France | |
| 1,067,314 | 6/1954 | France | 98/2 |
| 1,054,992 | 2/1954 | France | 98/2 |

*Primary Examiner*—Charles J. Myhre
*Assistant Examiner*—Paul Devinsky
*Attorney, Agent, or Firm*—Stevens, Davis, Miller & Mosher

[57] ABSTRACT

This invention relates to an automatic device for controlling the shutter associated with the fan of a motor vehicle, as a function of its relative speed with respect to the surrounding atmosphere. This shutter and the fan speed are controlled through a rod adjustable in length and connected at one end to the movable wall of bellows forming a vacuum chamber and at the other end to the movable member of a rheostat and/or switch inserted in the electric circuit for energizing the fan motor, said vacuum chamber communicating with the vacuum area of a Venturi choke receiving the incoming air flow due to the relative wind.

7 Claims, 4 Drawing Figures

VENTILATION SHUTTER CONTROL OF MOTOR VEHICLE

The present invention relates in general to ventilation systems of motor vehicles and has specific reference to an automatic device for controlling a ventilation air-intake shutter assembly, operating as a function of the vehicle speed in relation to the air.

Various means have already been proposed in the art for automatically controlling the ventilation or heating system of a motor vehicle by means responsive to the relative speed of the vehicle with respect to the surrounding atmosphere.

As a rule, the air necessary for ventilating, heating and demisting the interior of a passenger vehicle is taken at the front of the vehicle, by an intake disposed in an area exposed to an overpressure due to the vehicle operation.

Various ventilation and heating systems have thus been proposed with the specific object of maintaining at a constant value the air output derived from this intake, irrespective of the vehicle speed.

Thus, more particularly, in a prior French Patent No. 1.285.410, a control device is disclosed which is responsive to the pressure exerted by the relative wind at the front of the vehicle for starting, stopping and possible regulating the velocity of rotation of an auxiliary fan adapted to maintain a sufficient air throughput at low vehicle speeds, but obviously this device is ill-suited for maintaining a constant output throughout the range of vehicle speeds.

Other control devices have been proposed notably in the U.S. Pat. No. 3.587.439 and the French Pat. No. 1.586.880, both relating to automatic means for controlling the position of a ventilation shutter of a motor vehicle.

It is the essential object of this invention to avoid the inconveniences of the above-mentioned devices by providing an improved control device adapted automatically to adjust the air output introduced into the passenger compartment of a motor vehicle as a function of the relative speed of the vehicle with respect to the surrounding atmosphere, this device operating without consuming any energy from the conventional power sources of the vehicle.

The control device according to this invention is adapted automatically to actuate the movable shutter of an air intake of the ventilation system of the motor vehicle which comprises a fan driven from an electric motor, this control device being characterised in that said shutter is controlled through a movable rod adjustable in length and connected on the one hand to the movable wall of a vacuum chamber communicating with the vacuum zone of a venturi choke having its inlet end supplied with air from the relative wind and on the other hand to the movable arm of a rheostat and/or switch inserted in the energizing circuit of said fan motor.

With this device the speed of the ventilation fan and the angular position of the air intake shutter are adjusted automatically as a function of the velocity of the relative wind, i.e., the vehicle speed, the only manual operation required consisting in the preliminary setting of the shutter inclination.

Other features and advantages of this invention will appear as the following description proceeds with reference to the accompanying drawing illustrating diagrammatically by way of example a typical form of embodiment of the invention. In the drawing.

Figure 1:
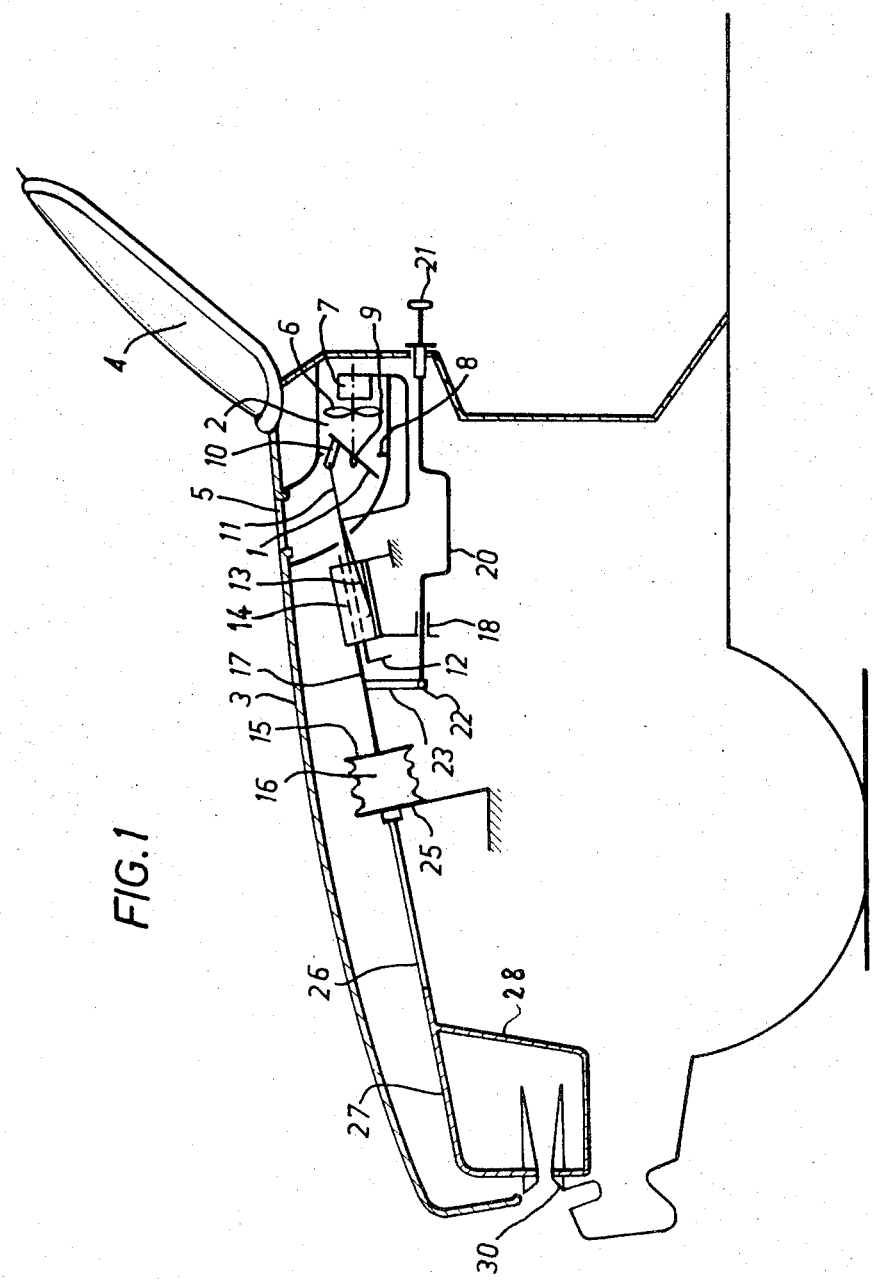
FIG. 1 is a diagrammatic vertical section showing the front bonnet of a motor vehicle equipped with the shutter control device according to this invention.
Figure 2:
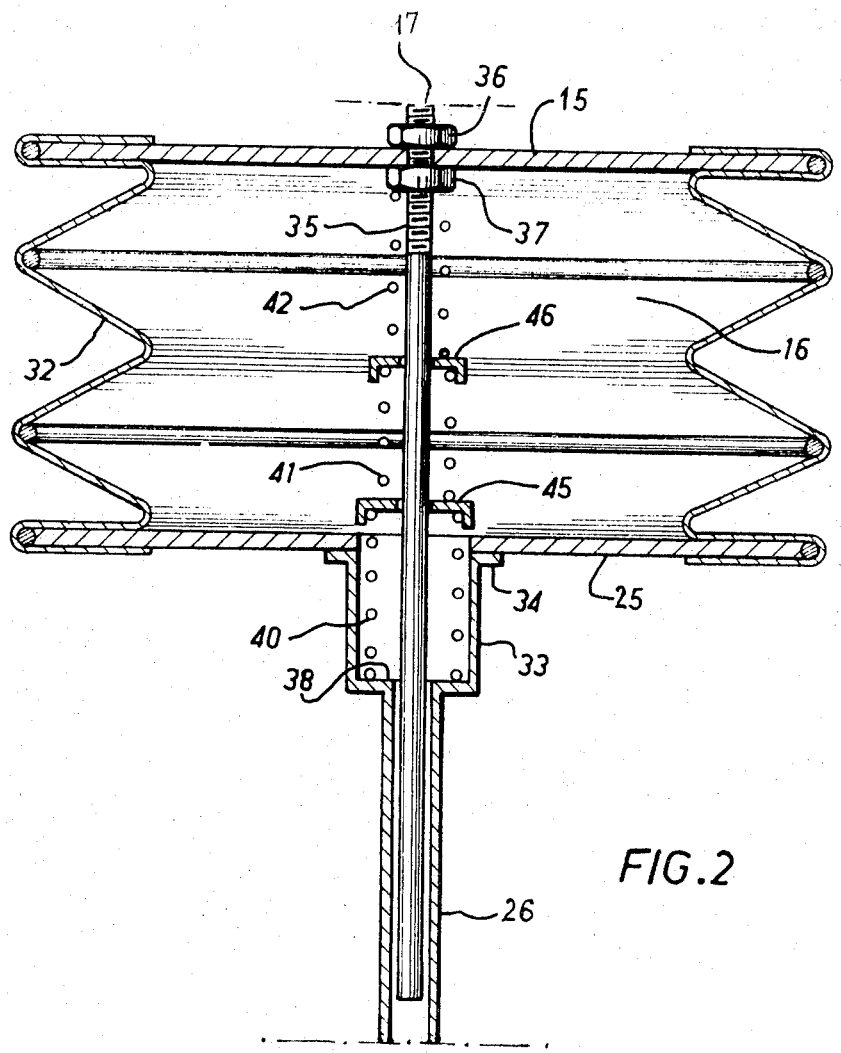
FIG. 2 is an axial section illustrating on a larger scale details of a typical vacuum chamber constituting one of the elements of the device.
Figure 3:
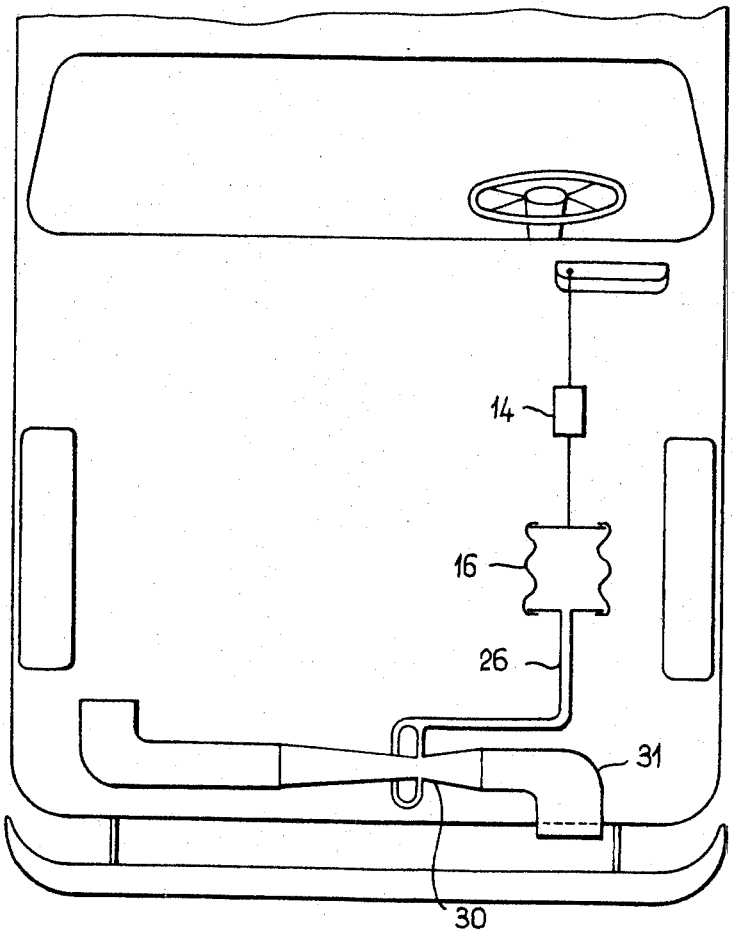
FIG. 3 is a plan view of a motor vehicle equipped with a transverse mounted Venturi.
Figure 4:
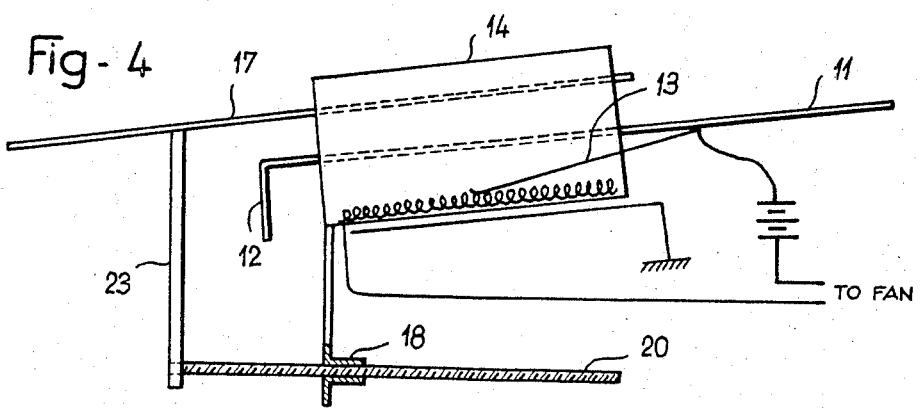
FIG. 4 is an enlarged view of rheostat 14.

the specific form of embodiment illustrated in FIGS. 1 and 2 the ventilation shutter 1 is secured inside a ventilation duct 2 housed under the bonnet 3 of a passenger motor vehicle, behind the dashboard or instrument panel and beneath the windscreen 4. The ventilation duct 2 communicates with the external atmosphere via an air intake 5. A fan 6 driven from an electric motor 7 is fitted in the duct 2 behind said shutter 1 in order to draw the air flowing through said intake 5 and direct same towards the interior of the car via suitable duct means (not shown). In the closed position the shutter 1 (this shutter having for example a circular configuration) engages with its outer peripheral edge an annular wall 8 constituting throttled section of duct 2. This shutter 1 is pivotally mounted about a shaft 9 nearer to the lower edge than to the upper edge of shutter 1; under these conditions, the edges of shutter 1 are constantly urged by gravity away from the annular wall 8 and thus keep a free passage in said duct 2. In the vicinity of its upper edge the shutter 1 comprises an integral lug 10 having its outer end pivotally connected to one end of a rod 11 having its opposite end 12 bent substantially at right angles. A movable contact member 13 rigid with said rod 11 is in constant resilient sliding contact with the turns of the coil of a rheostat 14 connected via a movable rod 17 to the movable wall of a vacuum chamber 16. This rheostat 14 is also solid with a tapped socket 18 so as to follow the axial movement adapted to be imparted to this socket 18 in one or the other direction by a control rod 20 engaging this socket with a corresponding screw-threaded portion, the rotation of this control rod 20 being adapted to be controlled by means of a knob 21 projecting from the instrument panel or dashboard of the vehicle. At its end opposite to that carrying the control knob 21 the rod 20 comprises a ball joint 22 for swivel connection with the depending arm 23 rigid with said movable rod 17. The vacuum chamber 16 also comprises a fixed wall 25 into which opens a pipe line 26 extending to the front of the vehicle and having a forked section 27, 28 opening into a pair of diametrally opposite orifices formed in the throttled portion of a Venturi choke 30 disposed horizontally at the level of the radiator grille, with the more divergent section facing the incoming air stream. It may be seen that although this Venturi choke 30 is disposed preferably parallel to the longitudinal axis of the vehicle, if for any constructional reason a transverse mounting thereof were deemed necessary it would only be sufficient to associate therewith a duct 31 facing the incoming relative wind with its inlet end as shown in FIG. 3.

As shown in FIG. 2 the vacuum chamber 16 comprises a fixed end wall 25 and a movable end wall 15 interconnected by resilient reinforced bellows 32 secured to the outer peripheral edge of said end walls.

The aforesaid pipe line 26 comprises an enlarged portion at its end engaging the fixed end wall 25 to provide a cylindrical chamber 33 formed with an integral flange 34 for properly securing this pipe line 26 to the end wall 25. A screwthreaded portion 35 of the movable rod 17 permits of securing the mobile end wall 15 thereto by means of a nut 36 and lock nut 37. A cylindrical coil compression spring 40 surrounds the rod 17 and reacts between the outer bottom of chamber 33 and the inner bottom of a cup 45, the other face of this cup 45 being engaged by another coil compression spring 41 supporting in turn a cup 46 engaged on the other hand by a third coil compression spring 42 reacting against the movable end wall 25 of the vacuum chamber 16.

With this arrangement the movement of wall 15 in relation to wall 25 is attended by the compression of the three coil springs 40, 41 and 42, and of course by the bending of bellows 32. These springs 40–42 are calculated to compensate any sudden pressure variations likely to occur at the inlet of choke 30 and intake 5, in order to produce a gradual movement of said movable wall 25. To explain the mode of operation of the device it may be assumed that the vehicle is being driven at low speed and that the relative wind produced by the driven vehicle flows through the duct 2 and engages the open shutter 1 and the motor driven fan 6. The relative wind or air flow also travels through the Venturi choke 30 and creates a reduced vacuum or negative pressure therein. Consequently, chamber 16 communicating with choke 30 via pipe lines 26 to 28 is also subjected to a certain vacuum or negative pressure. The air flow speed or rate increases gradually in choke 30, the vacuum also increases the volume of chamber 16 decreases due to its elasticity, the movable wall 15 approaching the fixed wall 25. The movable rod 17 following the movements of wall 15 carries along the rheostat 14, the latter moving towards the chamber 16. During this movement of rheostat 14 the rod 11 is stationary, like the rheostat arm 13 associated therewith. It is thus clear that the shorter the distance between the rheostat 14 and the chamber 16, the higher the resistance encountered by sliding contact 13 and the lower the speed of the fan driving motor 7, so that the fan speed decreases accordingly. If the relative speed of the vehicle continues to increase, the rheostat 14 eventually engages the end 12 of rod 11, thus causing the gradual closing of shutter 1.

From the foregoing it will be readily understood that the air input admitted into the passenger compartment of cab of the vehicle is adjusted automatically. The only manual operation required consists in presetting by means of control knob 21 the initial inclination of the shutter 1, this operation being performed beforehand, when the vehicle is still.

Of course, various modifications and variations may be brought to the specific form of embodiment of the invention shown and described herein, without departing however from the basic principle of the invention as set forth in the appended claims.

What is claimed as new is:

1. Automatic control device for the air-intake shutter of a ventilation system for a motor vehicle comprising a fan driven by an electric motor,
   an air-intake shutter,
   movable electrical control member interposed in the power circuit of said electric motor,
   means adapted to engage said shutter with said movable electrical control member to rotate said shutter,
   a Venturi choke having its air inlet fed with the relative wind created by the vehicle motion,
   a vacuum chamber having a movable end wall,
   means communicating said vacuum chamber with the depression zone of said Venturi choke,
   rigid means connecting said movable end-wall of said vacuum chamber with said movable electrical control member, and
   said movable electrical control member being rigid with a tapped socket engaged by the screwthreaded portion of a control rod adapted, by rotating a control knob associated therewith, to preset the distance between said movable member and said vacuum chamber.

2. Device according to claim 1, wherein said movable electrical control member is a rheostat.

3. Device according to claim 1, wherein said shutter is urged to its open position by having its fulcrum slightly off-set from its diameter.

4. Device according to claim 1, wherein said movable end wall of said vacuum chamber is connected to the fixed end wall through variable-flexibility resilient means, the chamber tightness being provided by using a reinforced bellows structure.

5. Device according to claim 4, wherein said variable-flexibility resilient connecting means comprise at least two coil compression springs having different diameters.

6. Device according to claim 1, wherein said choke is disposed longitudinally in front of the relative air flow.

7. Device according to claim 1, wherein said choke is disposed transversely and supplied with air from the relative air flow created by the vehicle during its operation through a duct having its inlet directed towards the incoming air flow.

* * * * *